(12) United States Patent
Inoue et al.

(10) Patent No.: US 6,351,362 B1
(45) Date of Patent: Feb. 26, 2002

(54) PROTECTION CIRCUIT FOR AN LCD CONTROLLER IC

(75) Inventors: Naoto Inoue; Tetsuo Shioura, both of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/328,108

(22) Filed: Jun. 8, 1999

(51) Int. Cl.⁷ .................................. H02H 3/22
(52) U.S. Cl. ..................... 361/111; 361/56; 257/355
(58) Field of Search .............................. 361/54, 56, 57, 361/88, 91.1, 91.5, 111; 257/355–363

(56) References Cited

U.S. PATENT DOCUMENTS

| | | | |
|---|---|---|---|
| 5,051,860 A | * 9/1991 | Lee et al. | 361/58 |
| 5,159,518 A | * 10/1992 | Roy | 361/56 |
| 5,631,793 A | * 5/1997 | Ker et al. | 361/56 |
| 5,751,525 A | * 5/1998 | Olney | 361/56 |
| 5,946,175 A | * 8/1999 | Yu | 361/56 |

* cited by examiner

Primary Examiner—Kim Huynh
(74) Attorney, Agent, or Firm—Adams & Wilks

(57) ABSTRACT

A protection circuit for an LCD controller IC comprises normally-off transistors through which a large current may escape, a resistor for disturbing the movement of charge in gate electrodes of transistors of an input circuit, and normally-off transistors for allowing electric charge in the gate electrodes of the transistors of the input circuit to escape. In one embodiment, the protection circuit includes first and second normally-off NMOS transistors connected to an input pad of the IC, a resistor arranged between the first and second normally-off NMOS transistors and the input circuit, and a third normally-off PMOS transistor and fourth normally-off NMOS transistor connected between the resistor and the input circuit.

48 Claims, 5 Drawing Sheets

PROTECTION CIRCUIT FOR AN LCD CONTROLLER IC

BACKGROUND OF THE INVENTION

The present invention relates to a protection circuit for an LCD controller which is used in a module having a panel mounted thereto.

With respect to electro-static breakdown, various kinds of models are well known (refer to an article of IEICE Technical Report, ED 94-58 (1994), pp. 25 to 30 for example). The typical ones are an HBM (Human Body Model) and an MM (Machine Model). In the case of the HBM, the pulse width relating to the movement of the electric charges is 10E-8 sec, while in the case of the MM, the pulse width relating to the movement of the electric charges is in the range of 10E-10 to 10E-9 sec.

Conventionally, there has been used a protection circuit having only a first normally-off type NMOS transistor 2 and a second normally-off type NMOS transistor 3 both of which are connected to an input pad 1 as shown in FIG. 2.

In the case of an LCD controller which is used in a module having a panel mounted thereto, the module is charged with the electric charges, and hence the model of a small capacity which is represented by a CDM (Charged Device Model) is charged with the electric charges. As a result, the movement of electric charges is more rapidly carried out compared with those of the HBM and the MM, and becomes on the order of picoseconds (in the range of 10E-12 to 10E-11 sec).

In the prior art, since the movement of electric charges is extremely rapid, the movement speed of the electric charges in an IC varies depending on the wiring capacity, the substrate resistance, the well resistance and the like. As a result, an electric field is applied across the gate oxide film of the MOS transistor constituting the input circuit and the gate oxide film is electro-statically broken down. The breakdown of the gate oxide film due to the rapid movement of the pulse becomes more and more remarkable as the scale down (shrink) has progressed to reduce the film thickness of the gate oxide film.

SUMMARY OF THE INVENTION

In order to prevent an electric field which will damage a gate oxide film from being applied across the gate oxide film, first and second normally-off type NMOS transistors are both provided between an input gate circuit and a resistor, and a third normally-off type PMOS transistor and a fourth normally-off type NMOS transistor are both provided right before an input circuit which is arranged after the resistor.

When an electric field is applied across a gate oxide film, the electric charges can be made to escape in the form of an avalanche breakdown current of diodes which the third and fourth transistors have or drains of the transistors, or in the form of a tunnelling current between bands, so that the electric field is prevented from being applied across the gate oxide film of the input circuit to avoid the gate oxide film from resulting in dielectric breakdown.

DETAILED DESCRIPTION

Embodiments of the invention will hereinafter be described with respect to the preferred embodiments.

(Embodiment 1)

Figure 1A:
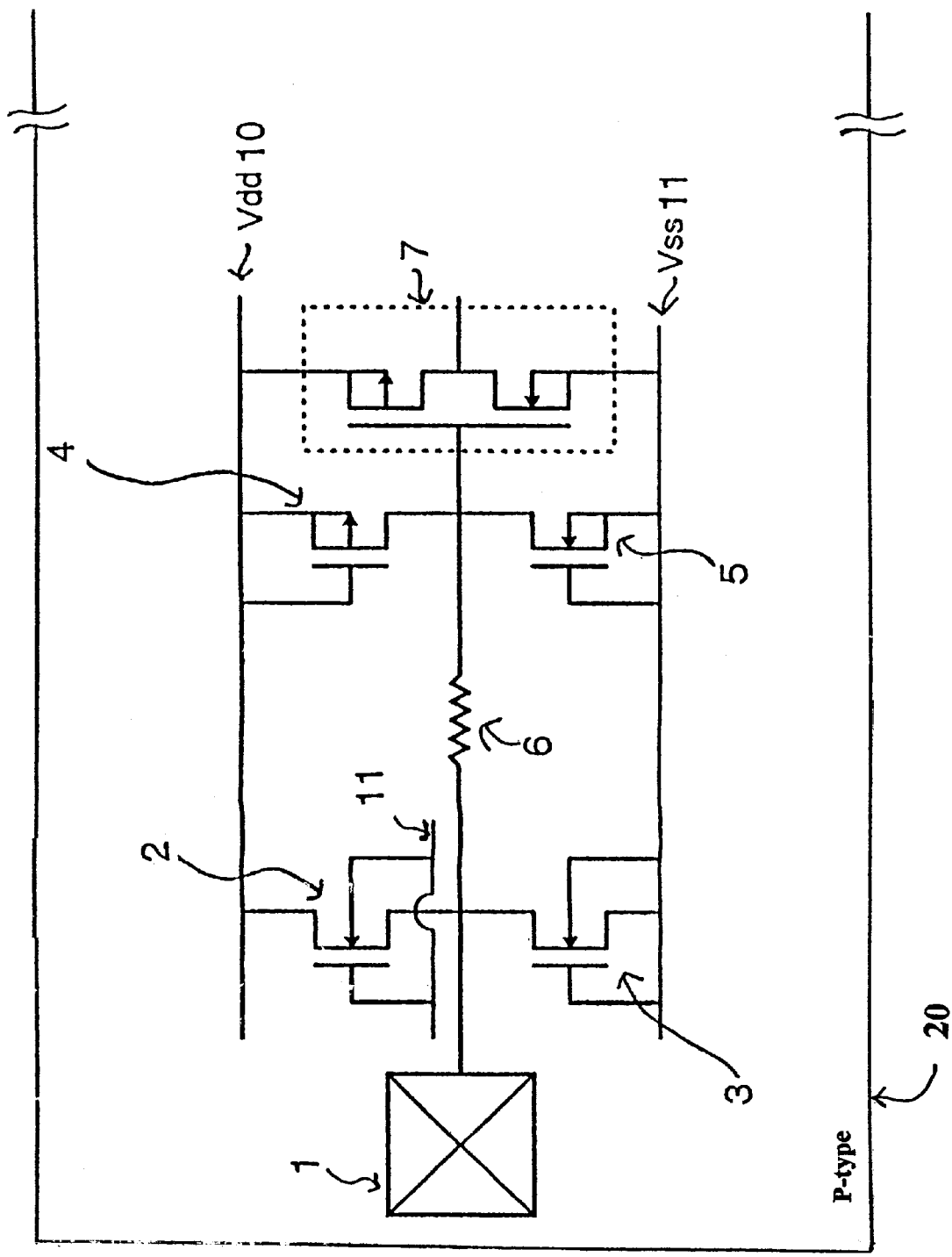
FIG. 1A is a circuit diagram of a protection circuit useful in explaining an embodiment 1 according to the present invention.
Figure 1B:
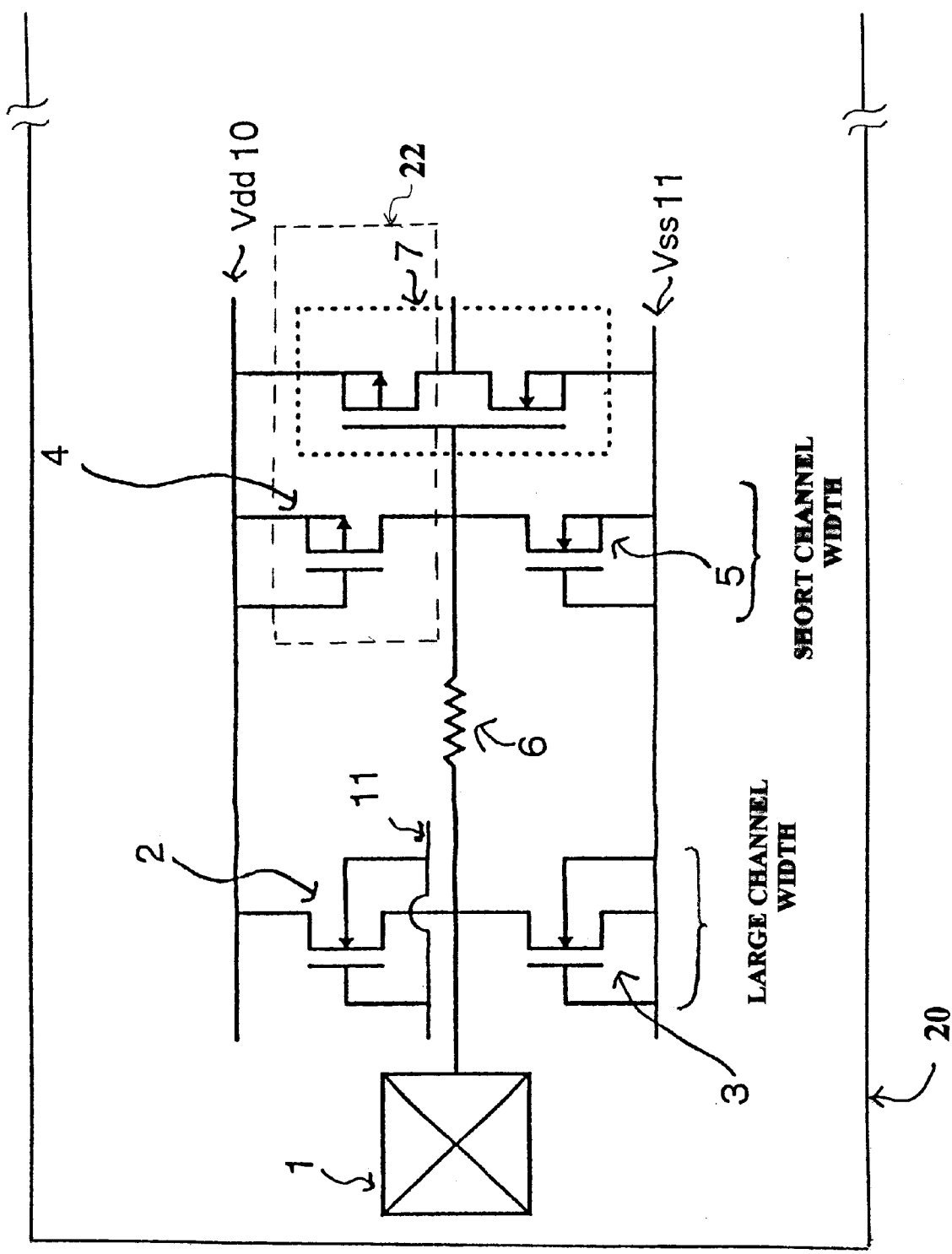
FIG. 1B is a circuit diagram of a protection circuit for explaining a variation of embodiment 1.
Figure 2:
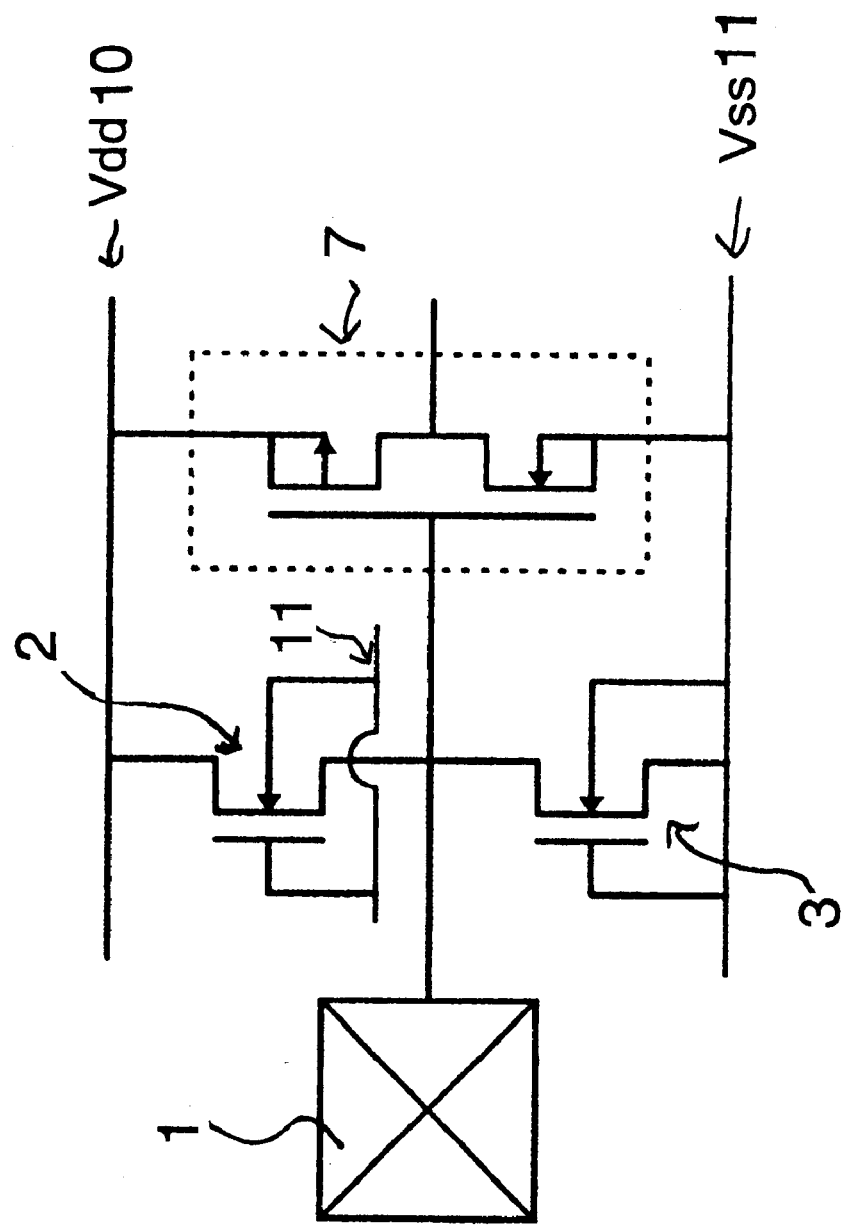
FIG. 2 is a circuit diagram of a protection circuit useful in explaining the prior art.

FIG. 1A shows an example in which a protection circuit according to the present invention is configured as an input circuit of an LCD controller IC provided on a P type semiconductor substrate 20. A first normally-off type NMOS transistor 2 through which an input pad 1 and a power source line 10 (hereinafter, referred to as "Vdd") are connected to each other, and a second normally-off type NMOS transistor 3 through which the input pad 1 and the grounding line 11 (hereinafter, referred to as "Vss") are connected to each other are both provided between the input pad 1 and an input inverter circuit 7.

The first and second transistors are better as their channel lengths are shorter and also their channel widths are wider. However, taking into consideration the fact that the channel leakage currents of those transistors are increased and also the protection system therefor becomes large in scale in this case, it is preferable that the channel length is in the range of 1 to 3 μm and the channel width is in the range of 100 to 300 μm. In addition, the electric potentials at gate electrodes of the first and second normally-off type transistors are both coupled to Vss. Also, a resistor 6 with 200 Ù or more resistance value is inserted between the first and second normally-off type NMOS transistors and the input inverter circuit 7. It should be noted that the resistor 6 is preferebly made of a polysilicon film, but it also may be formed of a diffused resistor which is formed in a semiconductor substrate. A third normally-off type PMOS transistor 4 is arranged between a resistor 6 and the input inverter circuit 7 so as to be connected to Vdd and also a fourth normally-off type NMOS transistor 5 is arranged between the resistor 6 and the input inverter circuit 7 so as to be connected to Vss. Each of the third and fourth normally-off type transistors may have a transistor channel width which is about a tenth of that of each of the first and second normally-off type transistors. A gate electrode of the third normally-off type PMOS transistor 4 is connected to Vdd, while a gate electrode of the fourth normally-off type NMOS transistor 5 is connected to Vss. In addition, the third normally-off type PMOS transistor 4 is preferably formed in the same well region 22 as that of a PMOS transistor of the input inverter circuit 7.

Next, a description will hereinbelow be given with respect to operation of the protection circuit described above. Since a display portion of a panel module to which the LCD controller IC is mounted is constituted by an insulating member, surface electric charges are easy to become accumulated in the insulating member, and hence the mode comes close to the CDM when grounding the panel module. It becomes a problem in the CDM that the electric field which is close to, equal to, or higher than the dielectric breakdown electric field of the gate oxide film is applied across the gate electrode, and the substrate, or the source electrode and the drain electrode between which the gate oxide film is sandwiched, to break down the gate oxide film. Then, in the configuration of the protection circuit according to the present invention, the first and second normally-off type NMOS transistors allow most of the electric charges accumulated in the IC escape therethrough with the aid of the avalanche breakdown of the drains thereof, or on the basis of forward operation of the diodes.

The resistor 6 which is provided between the first and second normally-off type transistors, and the third and fourth normally-off transistors in order for those electric charges not to immediately move to the input inverter circuit. Failing to provide the resistor would result, after having grounded the IC in, the electric charges which being allowed to accumulated in the gate electrodes are escape immediately, whereas the electric charges which are accumulated in the semiconductor substrate and the well region and not able to escape and, as a result, an electric field is applied across the gate oxide film. For this reason, while the resistance value of the resistor 6 needs to be sufficiently large, if the resistance value thereof is made too large, then the electric charges which are accumulated in the semiconductor substrate and the well region will be allowed to escape before those accumulated in the gate electrodes of the transistors of the input circuit will be allowed to escape. As a result, this also becomes the cause of an excessively large electric field being applied across the gate oxide film. Therefore, while the optimal value is present for the resistance value of that resistor, it is conceivable that the optimal value thereof varies depending on the layout of the circuit. Then, the resistance value of that resistor is made sufficiently large to make sufficiently slow the escape of the electric charges accumulated in the gate electrodes of the transistors of the input circuit.

Next, the second group comprising the normally-off type NMOS 5 and PMOS 4 transistors are provided right before the gate electrodes of the transistors of the input circuit. Then, in the case where the electric potential difference is developed across the gate electrodes and the semiconductor substrate due to the electric charges accumulated in the gate electrodes, the electric charges which are accumulated in the gate electrodes are allowed to escape in the form of an avalanche breakdown current of diodes formed by the transistors, or the drains of the transistors, or in the form of a tunneling current between bands flowing through the region between the substrate and the drains.

Therefore, since the third and fourth normally-off transistors are provided in order to only make the electric charges accumulated in the gate electrodes of the transistors of the input circuit escape therethrough, such a large current as in the first and second normally-off transistors is not caused to flow through each of the third and fourth normally-off type transistors and hence each of the third and fourth normally-off type transistors may be small in size.

The scale down in IC design rule in recent years has promoted thinning of the gate oxide films. While when an electric field is applied across the gate oxide film, the breakdown electric field is approximately 11 MV/cm, even if the gate oxide film is not broken down by an electric field equal to or higher than 8 MV/cm, the quality of the transistor can not be ensured due to the increase in leakage current at the lower electric field. For example, in the case of a gate oxide film of 200 Å in thickness, a gate voltage to be applied across the gate oxide film is permitted up to about 16V, and in the case of a gate oxide film of 150 Å in thickness, a gate voltage up to about 12V is permitted. Therefore, the third and fourth normally-off type transistors are desired through which current can be caused to flow at equal to or lower than the applied electric fields described above. As for the concrete measures, the following measures can be taken: the impurity concentration of the drain is made higher than that of the internal circuit and the tunnelling current between bands flowing through the region between the drain and the semiconductor substrate is caused to flow at the voltage which is slightly higher than Vdd.

(Embodiment 2)

Figure 3:
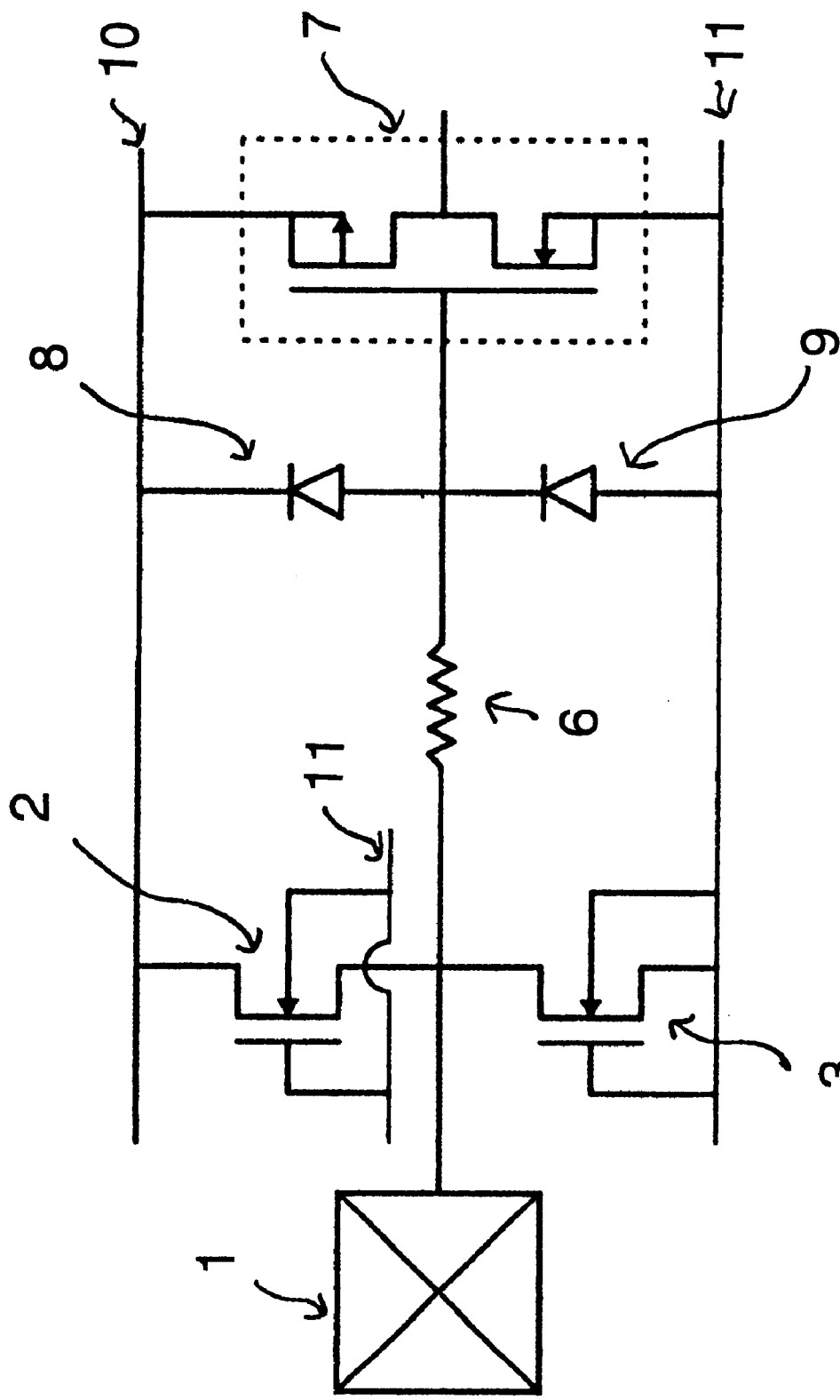
FIG. 3 is a circuit diagram of a protection circuit useful in explaining an embodiment 2 according to the present invention.

FIG. 3 shows another example in which a protection circuit according to the present invention is configured as an input circuit of an LCD controller IC which is provided on a P type semiconductor substrate. A first normally-off type NMOS transistor 2 through which an input pad 1 and a power source line (hereinafter, referred to as "Vdd") are connected to each other and a second normally-off type NMOS transistor 3 through which the input pad 1 and the grounding line 11 (hereinafter, referred to as "Vss" for short, when applicable) are connected to each other are both provided between the input pad 1 and an input inverter circuit 7.

A resistor 6 having a 200 Ù or more resistance value is inserted between the first and second normally-off type NMOS transistors, and the input inverter circuit 7. It should be noted that the resistor 6 is preferably made of a polysilicon film, but it may also be formed of a diffused resistor which is formed in a semiconductor substrate. A first diode which is constituted by an N+/P type substrate is arranged between the resistor 6 and the input inverter circuit 7 so as to be connected to Vdd and also a second diode which is constituted by a P+/N type well region is arranged between the resistor 6 and the input inverter circuit 7 so as to be connected to Vss. As illustrated in FIG. 3, those diodes are, of course, arranged in such a way that they are biased in the reverse direction during the operation of the IC. In addition, the first diode is preferably formed in the same well region as that of a PMOS transistor of the input inverter circuit.

While the operation of the protection circuit of embodiment 2 is essentially the same as that of the protection circuit of embodiment 1, since the diodes are rather than transistors, they are operated either in the forward direction or in the reverse direction.

(Embodiment 3)

Figure 4:
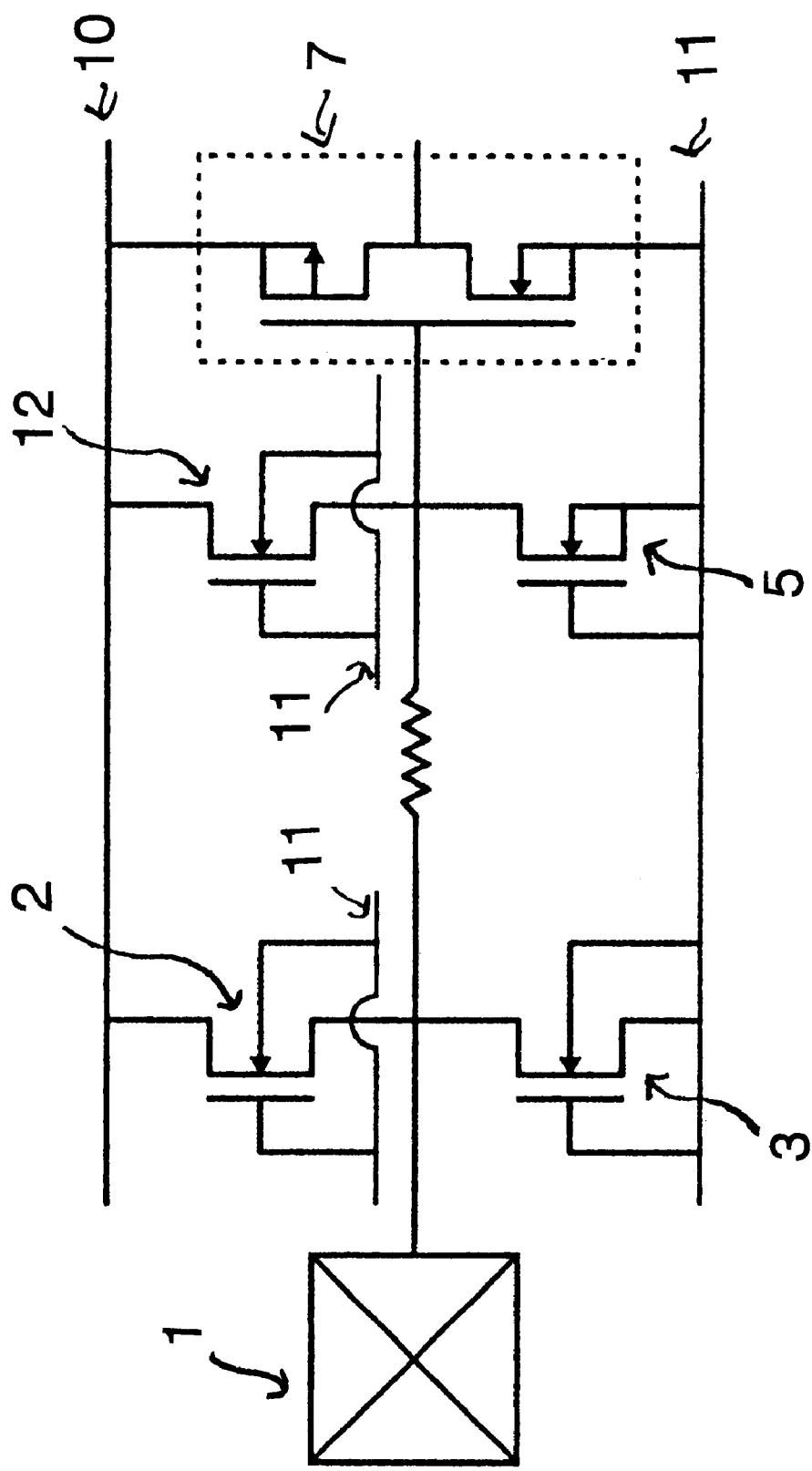
FIG. 4 is a circuit diagram of a protection circuit useful in explaining an embodiment 3 according to the present invention.

FIG. 4 shows still another example in which a protention circuit according to the present invention is configured as an input circuit of an LCD controller IC which is provided on a P type semiconductor substrate. A first normally-off type NMOS transistor 2 through which an input pad 1 and a power source line 10 (hereinafter, referred to as "Vdd") are connected to each other and a second normally-off type NMOS transistor 3 through which the input pad 1 and the grounding line 11 (hereinafter, referred to as "Vss") are connected to each other are both provided between the input pad 1 and an input inverter circuit 7.

A resistor 6 having a 200 Ù or more resistance value is inserted between the first and second normally-off type NMOS transistors, and the input inverter circuit 7. It should be noted that the resistor 6 is preferably made of a polysilicon film, but it may also be formed of a diffused resistor which is formed in a semiconductor substrate. A normally-off type NMOS transistor 12 is arranged between the resistor 6 and the input inverter circuit 7 so as to be connected to Vdd and also a fourth normally-off type NMOS transistor 5 is arranged between the resistor 6 and the input inverter circuit 7 so as to be connected to Vss. Each of the normally-off type NMOS transistor 12 and the fourth normally-off type transistor may have channel transistor channel width which is about a tenth of that of each of the first and second normally-off type transistors. A gate electrode of the normally-off type NMOS transistor 12 and a gate electrode of the fourth normally-off type NMOS transistor are both connected to Vss.

While in the embodiments 1 to 3, a description has been given with respect to the case of a P type semiconductor substrate, in the case as well of an N type semiconductor substrate, the present invention may be implemented by utilizing NMOS transistors which are formed in a P type well region. A point of difference of the case of the N type semiconductor substrate from the case of the P type semiconductor substrate is only that the fourth normally-off type NMOS transistor is preferably formed in the same P type well region as that of an NMOS transistor of the input circuit.

In an LCD controller IC which is configured according to the present invention, since a protection circuit can prevent the large electric field from being applied across the gate oxide film, the gate oxide film is prevented from being electro-statically broken down at all.

What is claimed is:

1. A protection circuit for an input inverter circuit of an LCD controller IC, comprising: a first normally-off NMOS transistor connected between an input pad of the LCD controller IC and a first power source line; a second normally-off NMOS transistor connected between the input pad and a second power source line; a third normally-off transistor comprising one of a normally-off PMOS and a normally-off NMOS transistor connected between the first power source line and the input inverter circuits; a fourth normally-off NMOS transistor connected to the second power source line and the input inverter circuit; and a resistor connected between a first connection point between the first and second normally-off NMOS transistors and a second connection point between the third and fourth normally-off transistors; wherein channel widths of the third and fourth normally-off transistors are smaller than channel widths of the first and second normally-off transistors so that an electrostatic discharge may be passed to ground by one of an avalanche current produced in the fourth normally-off NMOS transistor, through drains of the third and fourth transistors, or in the form of a tunnel current between bands in the third and fourth transistors.

2. A protection circuit for an LCD controller IC according to claim 1; wherein the third normally-off transistor and the fourth normally-off NMOS transistor are each connected to function as diodes.

3. A protection circuit for an LCD controller IC according to claim 1; wherein the IC is formed in a P type semiconductor substrate.

4. A protection circuit for an LCD controller IC according to claim 1; wherein channel lengths of the first and second transistors are in range of about 1 $\mu$m to 3 $\mu$m, and channel widths of the first and second transistors are in range of about 100 $\mu$m to 300 $\mu$m.

5. A protection circuit for an LCD controller IC according to claim 4; wherein channel widths of the third and fourth transistors are about 1/10 as large as the channel widths of the first and second transistors.

6. A protection circuit for an LCD controller IC according to claim 1; wherein channel widths of the third and fourth transistors are about 1/10 as large as channel widths of the first and second transistors.

7. A protection circuit for an LCD controller IC according to claim 1; wherein gate electrodes of the first and second transistors are coupled to the second power source line.

8. A protection circuit for an LCD controller IC according to claim 1; wherein the resistor comprises a polysilicon film.

9. A protection circuit for an LCD controller IC according to claim 1; wherein the resistor comprises an impurity diffused in a substrate.

10. A protection circuit for an LCD controller IC according to claim 1; wherein a gate electrode of the third transistor is connected to the first power source line.

11. A protection circuit for an LCD controller IC according to claim 1; wherein a gate electrode of the fourth NMOS transistor is connected to the second power source line.

12. A protection circuit for an LCD controller IC according to claim 1; wherein the third transistor is a PMOS transistor formed in an impurity well in a substrate of the LCD controller IC, and a PMOS transistor of the input circuit is formed in the same impurity well.

13. A protection circuit for an LCD controller IC according to claim 1; wherein the first power source line comprises a power supply voltage and the second power source line comprises ground voltage.

14. A protection circuit for an LCD controller IC according to claim 1; wherein an impurity concentration of a drain region of the third and fourth transistors is higher than that of transistors of the input inverter circuit.

15. A protection circuit for an LCD controller IC according to claim 1; wherein the third and fourth transistors are of a size sufficient to allow only an avalanche current produced by charge accumulated in gate electrodes of transistors of the input inverter circuit.

16. A protection circuit for an input circuit of an LCD controller IC, comprising: a first normally-off NMOS transistor connected between an input pad of the IC and a first power source line; a second normally-off NMOS transistor connected between the input pad and a second power source line; a resistor connected between the first and second normally-off NMOS transistors and the input circuit; a first switching device connected between the resistor and the input circuit and connected to the first power source line; and a second switching device connected to the second power source line; wherein a current due to electrostatic discharge is passed to ground by an avalanche current produced in the second switching device, and the first and second switching devices are substantially smaller than the first and second normally-off transistors and are formed of a size sufficient to allow only an avalanche current produced by charge accumulated in gate electrodes of transistors of the input circuit.

17. A protection circuit for an LCD controller IC according to claim 16; wherein the first switching device comprises a third normally-off transistor comprising one of a PMOS transistor and an NMOS transistor having a smaller channel width than the first and second normally-off transistors.

18. A protection circuit for an LCD controller IC according to claim 17; wherein a gate electrode of the third normally-off transistor is connected to the first power source line.

19. A protection circuit for an LCD controller IC according to claim 17; wherein the third normally-off transistor has an impurity concentration in a drain region thereof higher than that of transistors of the input transistor circuit of the LCD controller IC.

20. A protection circuit for an LCD controller IC according to claim 16; wherein the second switching device comprises a fourth normally-off NMOS transistor having a smaller channel width than the first and second normally-off transistors.

21. A protection circuit for an LCD controller IC according to claim 20; wherein a gate electrode of the fourth normally-off NMOS transistor is connected to the second power source line.

22. A protection circuit for an LCD controller IC according to claim 20; wherein the fourth normally-off transistor has an impurity concentration in a drain region thereof higher than that of transistors of the input transistor circuit of the LCD controller IC.

23. A protection circuit for an LCD controller IC according to claim 16; wherein the first and second switching elements each comprises a diode.

24. A protection circuit for an LCD controller IC according to claim 16; wherein the IC is formed in a P type semiconductor substrate.

25. A protection circuit for an LCD controller IC according to claim 16; wherein channel lengths of the first and second transistors are in range of about 1 µm to 3 µm, and channel widths of the first and second transistors are in range of about 100 µm to 300 µm.

26. A protection circuit for an LCD controller IC according to claim 25; wherein the first and second switching elements comprise third and fourth normally-off transistors, and channel widths of the third and fourth transistors are about 1/10 as large as the channel widths of the first and second transistors.

27. A protection circuit for an LCD controller IC according to claim 16; wherein gate electrodes of the first and second transistors are coupled to the second power source line.

28. A protection circuit for an LCD controller IC according to claim 16; wherein the resistor comprises a polysilicon film.

29. A protection circuit for an LCD controller IC according to claim 16; wherein the resistor comprises an impurity diffused in a substrate.

30. A protection circuit for an LCD controller IC according to claim 16; wherein the first power source line comprises a power supply voltage and the second power source line comprises ground voltage.

31. An ESD protection circuit for protecting an internal circuit, comprising: a first transistor connected between an input terminal of the internal circuit and a supply voltage; a second transistor connected between the input terminal and a reference voltage; a resistor connected between a connection point of the first and second transistors and the internal circuit; a first switching device connected between the resistor and the internal circuit and connected to the supply voltage; and a second switching device connected to the internal circuit and the reference voltage; wherein a current due to electrostatic discharge is passed to ground by an avalanche current formed in the second switching device, and the first and second switching devices are substantially smaller than the first and second transistors and are of a size sufficient to allow only an avalanche current produced by charge accumulated in gate electrodes of transistors of the internal circuit.

32. An ESD protection circuit according to claim 31; wherein the first switching device comprises a third normally-off transistor comprising one of a PMOS transistor and an NMOS transistor.

33. An ESD protection circuit according to claim 32; wherein the third normally-off transistor has an impurity concentration in a drain region thereof higher than that of transistors of the internal circuit.

34. An ESD protection circuit according to claim 32; wherein a gate electrode of the third normally-off transistor is connected to the supply voltage.

35. An ESD protection circuit according to claim 31; wherein the second switching device comprises a fourth normally-off NMOS transistor.

36. An ESD protection circuit according to claim 35; wherein the fourth normally-off transistor has an impurity concentration in a drain region thereof higher than that of transistors of the internal circuit.

37. An ESD protection circuit according to claim 35; wherein a gate electrode of the fourth normally-off NMOS transistor is connected to the reference voltage.

38. An ESD protection circuit according to claim 31; wherein the first and second switching devices each comprises a diode.

39. An ESD protection circuit according to claim 31; wherein the IC is formed in a P type semiconductor substrate.

40. An ESD protection circuit according to claim 31; wherein channel lengths of the first and second transistors are larger than channel widths thereof.

41. An ESD protection circuit according to claim 40; wherein the channel lengths of the first and second transistors are about 100 times larger than the channel widths thereof.

42. An ESD protection circuit according to claim 31; wherein channel lengths of the first and second transistors are in range of about 1 µm to 3 µm, and channel widths of the first and second transistors are in range of about 100 µm to 300 µm.

43. An ESD protection circuit according to claim 31; wherein the first and second switching devices comprise third and fourth normally-off transistors, and channel widths of the third and fourth switching devices comprise transistors having channel widths about 1/10 as large those of the first and second transistors.

44. An ESD protection circuit according to claim 31; wherein gate electrodes of the first and second transistors are coupled to the reference voltage.

45. An ESD protection circuit according to claim 31; wherein the resistor comprises a polysilicon film.

46. An ESD protection circuit according to claim 31; wherein the resistor comprises an impurity diffused in a substrate.

47. An ESD protection circuit according to claim 31; wherein the internal circuit comprises an LCD controller circuit; and the ESD protection circuit and LCD controller circuit are formed on a substrate as an integrated circuit.

48. An ESD protection circuit according to claim 31; wherein the reference voltage comprises ground voltage.

* * * * *